United States Patent
Dudar et al.

(10) Patent No.: US 12,233,781 B2
(45) Date of Patent: Feb. 25, 2025

(54) SYSTEMS AND METHODS FOR PROVIDING VEHICLE PAYLOAD ASSISTANCE

(71) Applicant: Ford Global Technologies, LLC, Dearborn, MI (US)

(72) Inventors: Aed Dudar, Canton, MI (US); Fling Finn Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 17/659,859

(22) Filed: Apr. 20, 2022

(65) Prior Publication Data
US 2023/0339393 A1 Oct. 26, 2023

(51) Int. Cl.
*B60Q 9/00* (2006.01)
*G01G 19/02* (2006.01)
*G01G 19/08* (2006.01)

(52) U.S. Cl.
CPC .............. *B60Q 9/00* (2013.01); *G01G 19/02* (2013.01); *G01G 19/08* (2013.01); *G01G 19/086* (2013.01)

(58) Field of Classification Search
CPC ........ B60Q 9/00; G01G 23/005; G01G 19/02; G01G 19/08
See application file for complete search history.

(56) References Cited

U.S. PATENT DOCUMENTS

| | | | |
|---|---|---|---|
| 6,721,680 B2 | 4/2004 | Sorrells et al. | |
| 7,113,081 B1 * | 9/2006 | Reichow | G01G 23/005 340/425.5 |
| 11,066,081 B2 | 7/2021 | Niedert et al. | |
| 2003/0154798 A1 | 8/2003 | Weyand et al. | |
| 2016/0018253 A1 * | 1/2016 | O'Neil | G01G 19/4144 177/25.13 |
| 2017/0337437 A1 * | 11/2017 | Kanagaraj | G01G 19/08 |
| 2018/0195894 A1 * | 7/2018 | Salter | B60Q 5/005 |
| 2019/0337529 A1 * | 11/2019 | Niedert | B60W 30/146 |

(Continued)

FOREIGN PATENT DOCUMENTS

WO WO-2018124144 A1 * 7/2018 ............... B60P 1/04

OTHER PUBLICATIONS

Machine Translation of WO-2018124144-A1 (Year: 2018).*

(Continued)

*Primary Examiner* — Hussein Elchanti
*Assistant Examiner* — Kenneth M Dunne
(74) *Attorney, Agent, or Firm* — Emily Drake; Eversheds Sutherland (US) LLP (57) ABSTRACT

An example method executed by processor of a vehicle payload assistance system may include obtaining information about a first laden weight of a vehicle. The processor determines a weight difference between the first laden weight and a payload capacity of the vehicle, and further determines, based on the weight difference, a payload margin available for loading the vehicle. A vehicle payload assistance operation may then be executed that includes detecting a change in the first laden weight due to introduction of an object into the vehicle, obtaining information about a second laden weight of the vehicle after introduction of the object into the vehicle, determining that the second laden weight exceeds the payload margin available for loading the vehicle, and issuing an advisory to reduce the second laden weight by removing the object from the vehicle.

20 Claims, 5 Drawing Sheets

(56) References Cited

U.S. PATENT DOCUMENTS

2020/0023811 A1* 1/2020 Herman ............... B60R 25/01
2020/0055471 A1   2/2020 Niedert et al.
2023/0281552 A1* 9/2023 Khamis ............... G01G 19/08
                                                    705/330

OTHER PUBLICATIONS

Graxiano Fiorillo et al., Procedure for Statistical Categorization of Overweight Vehicles in a WIM Database, J. Transp. Eng., DOI: 10.1061/(ASCE), 2014, 1-12.

* cited by examiner

SYSTEMS AND METHODS FOR PROVIDING VEHICLE PAYLOAD ASSISTANCE

BACKGROUND

Overloading a vehicle can lead to some undesirable complications in at least some situations. For example, an overloaded vehicle may require a greater braking effort and a longer stopping distance than a vehicle carrying a lighter load. An overloaded vehicle may also lead to undesirable wear-and-tear upon vehicle components such as, for example, on tires, brakes, and engine. It is therefore desirable to provide solutions that address vehicle overloading issues.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, embodiments described in this disclosure are generally directed to systems and methods for providing vehicle payload assistance. An example method executed by processor of a vehicle payload assistance system may include obtaining information about a first laden weight of a vehicle. The processor determines a weight difference between the first laden weight and a payload capacity of the vehicle and further determines, based on the weight difference, a payload margin available for loading the vehicle. The processor then executes a vehicle payload assistance operation that may include detecting a change in the first laden weight due to introduction of an object into the vehicle, obtaining information about a second laden weight of the vehicle after introduction of the object into the vehicle, determining that the second laden weight exceeds the payload margin available for loading the vehicle, and issuing an advisory to reduce the second laden weight by removing the object from the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "information" as used herein pertains to any of various forms of data that can be processed by a processor (digital data, digital images, detector signals, etc.). The word "detector" as used herein refers to any device than may be used to obtain information about objects (particularly weight information), to detect the presence of an object, and/or to detect actions performed by individuals. The word "object" and the word "item" are used in this disclosure in an interchangeable manner. The word "vehicle" as used in this disclosure can pertain to any one of various types of vehicles such as cars, vans, sports utility vehicles, trucks, electric vehicles, gasoline vehicles, and hybrid vehicles. It must be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

Figure 1:
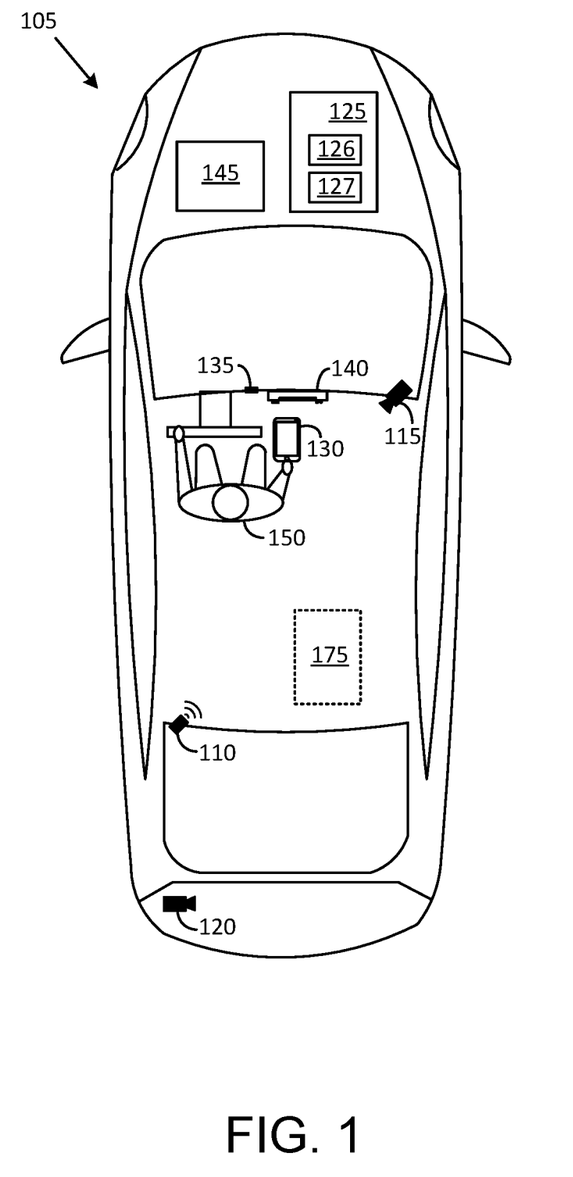
FIG. 1 shows an example vehicle that includes a vehicle payload assistance system in accordance with an embodiment of the disclosure.

FIG. 1 shows a vehicle 105 that includes a vehicle payload assistance system 125 in accordance with an embodiment of the disclosure. The vehicle 105 may further include components such as, for example, a vehicle computer 145, a weight sensor 175, an infotainment system 140, a beeper 135, and various detectors (such as, for example, a camera 115, a camera 120, and an object detector 110). These components may be communicatively coupled to the vehicle payload assistance system 125 and the vehicle computer 145. The object detector 110 can be implemented by use of any one or more devices such as, for example, a radar detector, a sonar detector, a light detection and ranging (LIDAR) detector and/or a motion detector.

The vehicle computer 145 may perform various functions of the vehicle 105, such as controlling engine operations (fuel injection, speed control, emissions control, braking, etc.), managing climate controls (air conditioning, heating etc.), activating airbags, and issuing warnings (check engine light, bulb failure, low tire pressure, etc.). The vehicle computer 145 may also provide various types of information to the vehicle payload assistance system 125, such as, for example, information pertaining to one or more actions performed by a driver 150 that change a laden weight of the vehicle 105. The phrase "laden weight" as used herein generally refers to a weight of the vehicle 105 when an item having weight is placed upon the vehicle 105 (such as, for example, a cargo item).

The weight sensor 175 may be arranged to detect weight parameters of the vehicle 105 under various conditions. In a first example condition, the vehicle 105 is unoccupied, and contains no cargo items (luggage, packages, etc.). In this first condition, the weight sensor 175 detects an unladen weight of the vehicle 105. The unladen weight may also be referred to as a tare weight.

In a second example condition, the vehicle 105 is unoccupied and contains one or more cargo items, such as, for example, a suitcase in a trunk of a sedan (when the vehicle 105 is a sedan) or a package in a cargo area of a delivery van (when the vehicle 105 is a delivery van). In this second condition, the weight sensor 175 detects a first laden weight of the vehicle 105.

In a third example condition, the vehicle 105 contains one or more occupants such as the driver 150 and a passenger (if present) and also contains one or more cargo items. In this third condition, the weight sensor 175 detects a second laden weight of the vehicle 105. The second laden weight corresponds to a weight of the occupants added to either the tare weight (when the vehicle 105 is unoccupied and contains no cargo items) or the first laden weight (when the vehicle 105 is unoccupied and contains cargo items).

In an example implementation in accordance with the disclosure, a weight parameter detected by the weight sensor 175 such as, for example, the tare weight, the first laden weight, and/or the second laden weight, is conveyed to the vehicle payload assistance system 125 for executing one or more operations in accordance with the disclosure.

An example operation can involve the vehicle payload assistance system 125 communicating with the infotainment system 140 to display a weight parameter and/or communicating with the beeper 135 to alert the driver 150 about a weight issue. In another example implementation, the vehicle payload assistance system 125 communicating with may communicate with a mobile device 130 carried by the driver 150 to provide information in accordance with the disclosure. The mobile device 130 can be any of various devices such as, for example, a smartphone, a tablet computer, or a wearable device (smartwatch, for example).

It must be understood that the description provided herein with respect to the infotainment system 140 is equally applicable to the mobile device 130 carried by the driver 150. Accordingly, in some cases, the driver 150 may stand outside the vehicle 105 and use the mobile device 130 to perform various actions in accordance with the disclosure.

In another example implementation in accordance with the disclosure, a weight parameter is provided to the vehicle payload assistance system 125 by a system or device other than the weight sensor 175. In an example scenario, the weight parameter (a laden weight, for example) is provided to the vehicle payload assistance system 125 by a vehicle weighing apparatus embedded in the ground (such as, for example, in a weighing station located beside an interstate highway for weighing commercial delivery trucks).

In this implementation, the vehicle payload assistance system 125 may use the weight parameter (the laden weight) provided by the vehicle weighing apparatus to display upon a display screen of the infotainment system 140, information pertaining to the weight parameter and/or information pertaining to various operations executed in accordance with the disclosure. Information pertaining to various operations executed in accordance with the disclosure can include operations associated with providing vehicle payload assistance, such as, for example, displaying a payload margin available for loading the vehicle 105 or displaying an alert of an overloading condition. These aspects are described below in more detail.

The infotainment system 140 may include a combination of various entertainment items (such as a radio, streaming audio solutions, etc., and USB access ports for digital audio devices) along with other items, such as, for example, a navigation system that provides navigation instructions and maps upon a display screen of the infotainment system 140.

The one or more cameras, which may be mounted at any of various locations on the vehicle 105, are communicatively coupled to the vehicle payload assistance system 125. The camera 120, for example, can be mounted at any of various locations on an exterior portion of the vehicle 105 (pointing towards the trunk area, pointing towards the cargo rack, pointing towards a cargo bed, pointing towards the trailer, etc.). The camera 115, for example, can be mounted at any of various locations in an interior portion of the vehicle 105 such as, for example, on a vehicle member (pillar, frame, etc.) in a cabin area of the vehicle 105.

Images provided by the cameras can be evaluated by the vehicle payload assistance system 125 for obtaining information associated with vehicle payload assistance operations. The images may be provided in any of various forms such as, for example, in the form of a digital image, a video clip, or a live video feed. In an example configuration, the images may be evaluated by the vehicle payload assistance system 125 in order to identify various objects that are located in the vehicle 105, to identify objects that an individual (such as, for example, the driver 150) is placing on/in the vehicle 105, and/or to identify objects that the individual may be removing from the vehicle 105.

An object being placed on the vehicle 105 by the individual can be, for example, an item being placed upon a cargo bed of the vehicle 105 (when the vehicle 105 is a truck or van, for example), a suitcase being loaded into a trunk of the vehicle 105 (when the vehicle 105 is a sedan, for example), a package being placed upon a cargo rack on the roof of the vehicle 105 (when the vehicle 105 is a sedan, for example), a boat being loaded onto a trailer attached to the vehicle 105, or an object that is being relocated inside a cabin area of the vehicle 105.

Information associated with objects being placed on/in the vehicle 105 may be obtained by the vehicle payload assistance system 125 based on signals and/or images received from one or more of the various detectors. In an example scenario, the vehicle payload assistance system 125 receives a signal from the object detector 110 that provides an indication that an object is being placed, relocated, or removed from the vehicle 105.

In another example scenario, the vehicle payload assistance system 125 receives a signal from the weight sensor 175 (such as, for example, triggered by a change in weight), that provides an indication that an object is being placed, relocated, or removed from the vehicle 105.

In yet another example scenario, the vehicle payload assistance system 125 evaluates images provided by the camera 120 and/or the camera 115 to detect an object being placed, relocated, or removed from the vehicle 105.

The vehicle payload assistance system 125 may not only evaluate images to detect objects being placed, relocated, or removed from the vehicle 105, but may also evaluate images to obtain information about objects that are being removed, or have been removed, from the vehicle 105. For example, in one scenario, the vehicle payload assistance system 125 may evaluate differences between a first image and a second image provided by the camera 120 and detect an object that is being removed, or has been removed, from the trunk, the cargo bed, or the cargo rack, of the vehicle 105. In another scenario, the vehicle payload assistance system 125 may evaluate images provided by the camera 115 to detect a person who is either located in the cabin, is entering the cabin, or is exiting the cabin of the vehicle 105.

The various examples provided above with respect to addition or removal of objects from the vehicle 105, results in weight changes, such as weight changes to the unladen weight, the first laden weight, or the second laden weight of the vehicle 105. The vehicle payload assistance system 125 may obtain information about such weight changes by evaluating signals and/or images received from one or more of the detectors described above. The information about weight changes may be used by the vehicle payload assistance system 125 to provide payload assistance to an individual (the driver 150, for example).

More particularly, in an example scenario, a processor 126 of the vehicle payload assistance system 125 is configured to access a memory 127 and execute computer-executable instructions stored in the memory 127 to perform various operations. The operations can include obtaining, from the weight sensor 175, weight information of the vehicle 105. The weight information may be evaluated to obtain information about a first laden weight of the vehicle 105. The processor 126 may evaluate one or more images obtained from one or more cameras (such as, for example, the camera 115 and/or the camera 120) in order to obtain information about objects that contribute to the first laden weight.

The processor 126 may then detect introduction of an object into the vehicle 105 such as, for example, an object being placed on the cargo bed of the vehicle 105, or a passenger entering the vehicle 105. The detection may be made by obtaining information from the weight sensor 175 and/or by evaluating one or more images obtained from one or more cameras.

Upon detecting the introduction of an object into the vehicle 105, the processor 126 may obtain, and evaluate weight information received from the weight sensor 175. The evaluation can include identifying a change in the first laden weight to a second laden weight due to introduction of the object into the vehicle. The processor 126 may then determine that the second laden weight exceeds a payload capacity of the vehicle. The payload capacity of the vehicle 105 may be obtained, for example, from a database of the vehicle payload assistance system 125, a database of a computer located outside the vehicle 105, or from cloud storage. Obtaining payload capacity information from the database of the computer located outside the vehicle 105 or from cloud storage, may be carried out by use of wireless communications via a wireless communication system (not shown) provided in the vehicle 105.

If the processor 126 determines that the second laden weight exceeds the payload capacity of the vehicle 105, an "overweight" advisory may be issued in order to alert the driver 150 of an overweight condition of the vehicle 105. The advisory may be issued in the form of information displayed on the display screen of the infotainment system 140 or on the mobile device 130. The information can include, for example, the payload capacity of the vehicle 105, the payload margin that was available for loading the vehicle 105 prior to introduction of the object into the vehicle 105, and/or excess weight information (a difference between the second laden weight and the payload capacity of the vehicle 105). In one implementation, the payload margin may be identified by determining a weight difference between a laden weight of the vehicle 105 and a payload capacity of the vehicle 105. In another implementation, the payload margin may be identified by determining a weight difference between a laden weight of the vehicle 105 and a threshold weight limit.

In one case, the threshold weight limit is equal to the payload capacity of the vehicle 105. In another case, the threshold weight limit is equal to a weight value that is lower than the payload capacity of the vehicle 105. The weight value can be defined, for example, as a percentage with respect to the payload capacity (for example, 90% of the payload capacity, 10% below the payload capacity, 20 lbs. below the payload capacity, etc.).

The processor 126 may further provide guidance on how to reduce the second laden weight below a threshold weight limit. The guidance provided by the processor 126 can include a suggestion to remove an object from the vehicle 105. The processor 126 may identify the object to be removed from the vehicle 105, by referring to an inventory of objects stored in a database of the vehicle payload assistance system 125 (or stored in a device such as a computer located outside the vehicle 105 or a cloud storage device). In an example scenario, the advisory to reduce the second laden weight may include recommending refraining from filling a fuel tank of the vehicle 105 beyond a first threshold level or reducing an amount of fuel contained in the fuel tank of the vehicle 105.

The inventory may be created by executing an inventorying procedure at various instants in time. In an example implementation, the inventorying procedure may be executed each time the vehicle 105 is started. The inventorying procedure may include the processor 126 evaluating images of various objects located inside and/or outside the vehicle 105. The images can be provided by various cameras such as the ones described above. A weight of each of the objects may be obtained from the weight sensor 175 and included in the inventory. The various objects that are identified and stored in the inventory can include one or more individuals who enter the vehicle 105 such as, for example, the driver 150 and a passenger.

The object to be removed can either be the object that triggered the overweight advisory or a second object. The second object can be either an object that was placed in the vehicle 105 by an individual or can be a part of the vehicle 105. Some examples of the second object placed in the vehicle 105 can include an item on a cargo bed of the vehicle 105 (when the vehicle 105 is a truck or van, for example), a suitcase in a trunk of the vehicle 105 (when the vehicle 105 is a sedan, for example), a package on a cargo rack on the roof of the vehicle 105 (when the vehicle 105 is a sedan, for example), a boat on a trailer attached to the vehicle 105, or a person seated in the cabin of the vehicle 105. Some example items that may be placed in the vehicle 105 (trunk, cargo bed and/or the roof of the vehicle 105) can include a tool, a machine component, a ladder, a set of golf clubs, garments, groceries, a backpack, a power generator, a pump, a dehumidifier, and an air compressor.

Some examples of the second object that is a part of the vehicle 105 can be a fixture such as, for example, a child safety seat, a spare tire, a body part of the vehicle 105, or a part of a chassis of the vehicle. The body part of the vehicle 105 can include items such as a door or a removable roof of the vehicle 105.

The processor 126 may evaluate the weights of various objects (including occupants of the vehicle 105) to identify one or more objects that may be suitable for removal from the vehicle 105. The evaluation can include comparing a weight of an object to a payload margin available for loading the vehicle 105. In some cases, it may be necessary to remove more than a single object from the vehicle 105 in order to reduce the second laden weight below the threshold weight limit.

The processor 126 may evaluate images to detect removal of an object from the vehicle 105. Upon detecting a removal of an object, the processor 126 may reassess the second laden weight of the vehicle 105 and determine of the second laden weight is below the threshold weight limit. If the second laden weight is still above the threshold weight limit, the processor 126 may provide additional guidance on how to reduce the second laden weight below the threshold weight limit. The guidance procedure can be repeated until the second laden weight falls below the threshold weight limit at which time, the processor 126 may provide an indication that the vehicle 105 has a satisfactory laden weight and is in a satisfactory condition for use.

If the guidance procedure does not provide a satisfactory result (second laden weight below the threshold weight limit) or if the guidance is disregarded, the processor 126 may provide additional guidance for operating the vehicle 105. In an example implementation, the processor 126 may communicate with one or more elements (such as, for example, a navigation system of the vehicle 105, a computer located outside the vehicle, and/or a cloud storage element) to obtain and provide to the driver 150, information about a travel route that is advisable for the driver 150 to follow. The travel route may include a first road section that allows the vehicle 105 to travel in a manner that reduces or minimizes vehicle bounce and a second road section that causes excessive vehicle bounce. Vehicle bounce may be caused by various factors such as, for example, by an unpaved road surface, a gravel road, or a bumpy road surface. In some cases, excessive vehicle bounce may lead to damage of the vehicle 105 (struts, axel, wheels, etc.) particularly when the vehicle 105 is ill-suited for such type of travel (a sedan, a small van, or a vehicle having low round clearance, for example).

Figure 2:
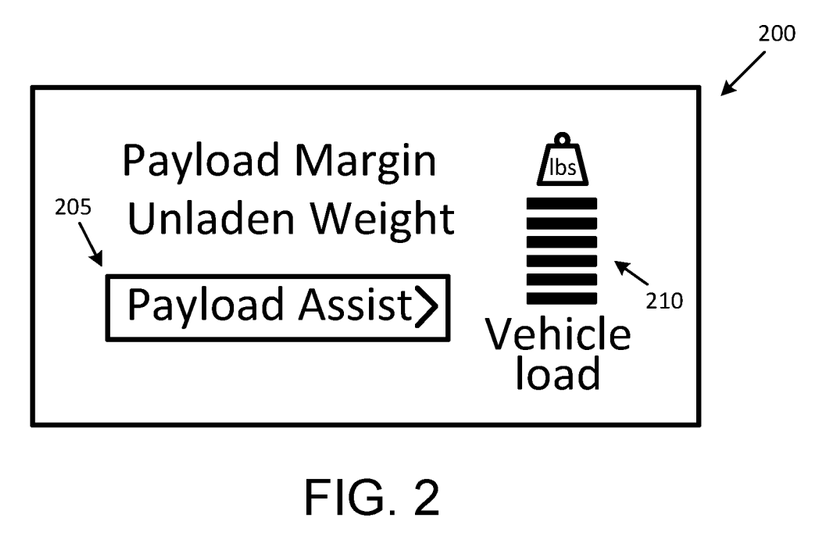
FIG. 2 shows an example display that may be displayed upon a display screen of an infotainment system of a vehicle in accordance with an embodiment of the disclosure.

FIG. 2 shows an example display 200 that may be displayed upon a display screen of the infotainment system 140 of the vehicle 105. The display 200 can include various icons such as, for example, a Payload Assist 205 icon and a bar graph 210 that pertains to the vehicle payload assistance system 125. In an example operation, the driver 150 may make a selection upon the display 200 by selecting the Payload Assist 205 icon. The selection operation can be carried out in various ways. In one implementation, the driver 150 may touch the Payload Assist 205 icon to make a selection. The display of the infotainment system 140 in this case is a touchscreen display. In another implementation, the display screen of the infotainment system 140 can be configured to provide a visual indication of a selection made by the driver 150 by use of a joystick on a control console in the cabin of the vehicle 105.

The vehicle payload assistance system 125 may respond to the selection by executing an assistance procedure. As a part of this procedure, the vehicle payload assistance system 125 may display additional messages and graphics on the display 200 such as, for example, a first message that suggests removal of an item from the vehicle 105 and the bar graph 210 that indicates a current laden weight of the vehicle 105. The bar graph may have one or more color formats, such as, for example, red to indicate further weight reduction is desirable and green to indicate that the laden weight is acceptable and below the payload capacity of the vehicle 105. The driver 150 may make use of the bar graph 210 to take action to modify the laden weight of the vehicle 105.

Figure 3:
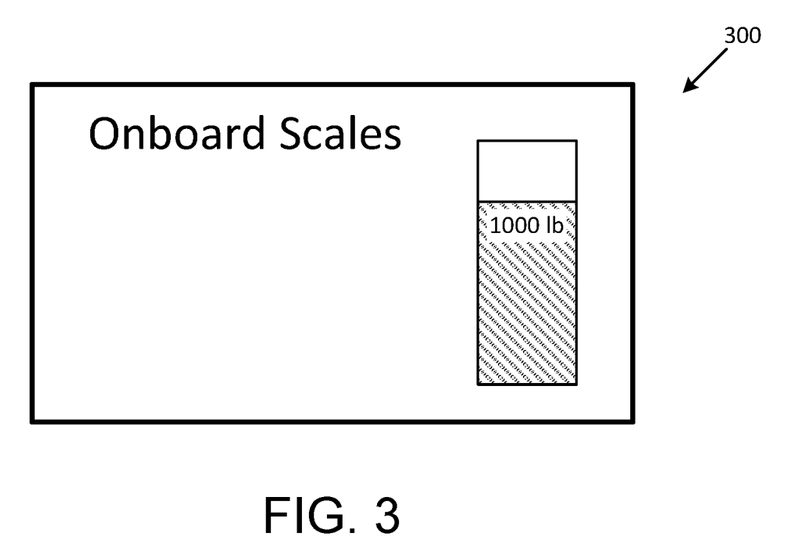
FIG. 3 shows another example display that may be displayed upon a display screen of an infotainment system of a vehicle in accordance with an embodiment of the disclosure.

FIG. 3 shows another example display 300 that may be displayed upon a display screen of the infotainment system 140 of the vehicle 105. The display 300 pertains to a payload carried by the vehicle 105 and may provide information such as, for example, an approximate weight of occupants and cargo items imposed upon the wheels of the vehicle 105. The driver 150 may use the displayed information to make decisions, such as decreasing a load.

Figure 4A:
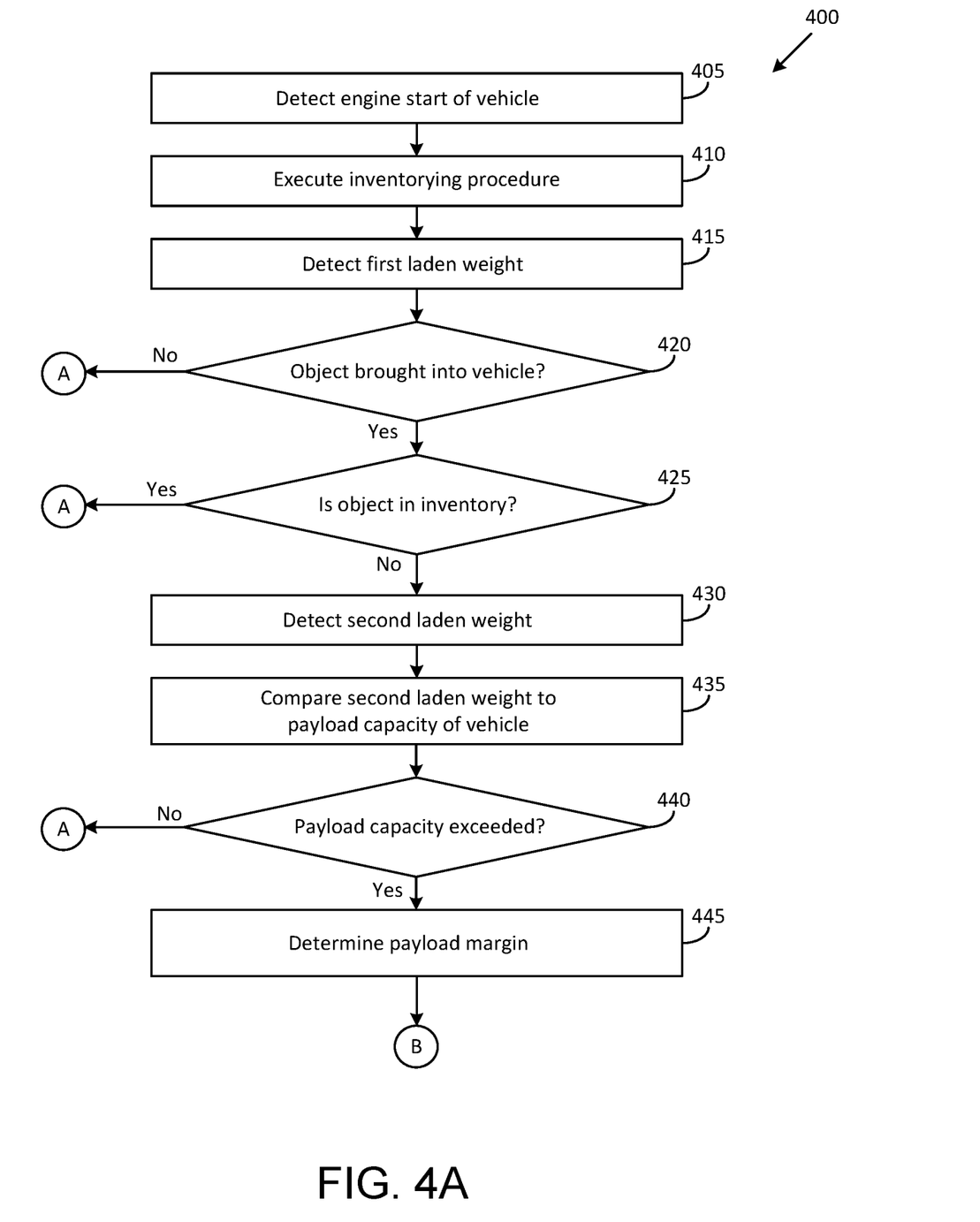
FIG. 4A and FIG. 4B shows a flowchart of a method to provide vehicle payload assistance in accordance with an embodiment of the disclosure.
Figure 4B:
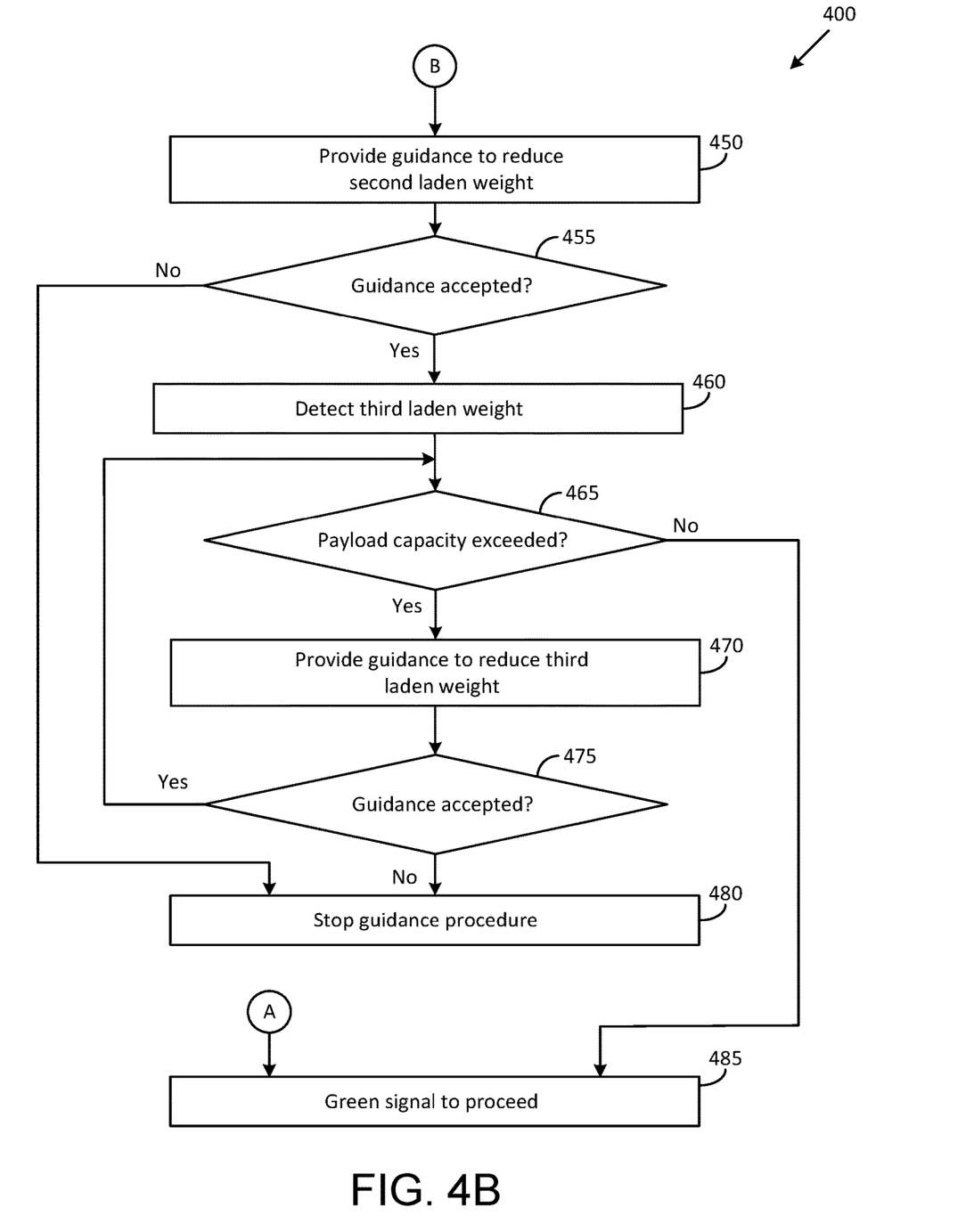

FIG. 4A and FIG. 4B shows a flowchart 400 of a method to provide vehicle payload assistance in accordance with an embodiment of the disclosure. The flowchart 400 illustrates a sequence of operations that can be implemented in hardware, software, or a combination thereof. In the context of software, the operations represent computer-executable instructions stored on one or more non-transitory computer-readable media such as the memory 127 of the vehicle payload assistance system 125, that, when executed by one or more processors such as the processor 126, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 405, the processor 126 detects an engine of the vehicle 105 being started. In an example scenario, the detection may be based on receiving information from the vehicle computer 145.

At block 410, the processor 126 initiates an inventorying procedure. The inventorying procedure may include the processor 126 evaluating images of various objects located inside and/or outside the vehicle 105. The images can be provided by various cameras such as the ones described above. A weight of each of the objects may be obtained from the weight sensor 175 and included in the inventory. The various objects that are identified and included in the inventory can further include one or more individuals who enter the vehicle 105, such as the driver 150 and one or more passengers. The inventory may be stored in a database of the vehicle payload assistance system 125.

In an example scenario, the inventorying procedure includes referring to a laden weight of the vehicle 105 when the engine was last turned off and/or objects that contributed to the laden weight when the engine was last turned off. The objects can include occupants of the vehicle 105. In an example implementation, the processor 126 may display a message on the display screen of the infotainment system 140 requesting the driver 150 to verify and/or edit the information pertaining to the objects. In one case, the driver 150 may respond by providing input about upcoming travel events and about any change in human occupancy (number, weight, etc.) during the upcoming travel events or a current travel event. In another case, the driver 150 may respond by providing input about various objects such as, for example, about objects currently present in the vehicle 105 and objects that may be brought into the vehicle 105 during an upcoming travel event.

The processor 126 may modify the inventory based on the input provided by the driver 150. The processor 126 may also carry out additional operations upon the inventory such as, for example, add to an objects list, one or more objects that may be brought into the vehicle 105 and weight information related to these objects. The type of objects and the weight of the objects can vary at various instants in time (day, week, season, year, etc.). For example, work related objects (a briefcase, a computer, a suit, etc.) may be brought into the vehicle 105 during weekdays, leisure related objects (a tennis racket, a golf club, pair of sneakers, etc.) may be brought into the vehicle 105 during weekends, summer gear (a backpack, a bicycle, a pair of hiking boots, etc.) may be brought into the vehicle 105 during winter months, and winter equipment (skis, jackets, etc.) may be brought into the vehicle 105 during winter months.

In some cases, the processor 126 may predict a weight of an object that may be brought into the vehicle 105 at a predicted time. Such predictions may be based on historical information gathered by the processor 126 during previous travel of the vehicle 105. In one implementation, the processor 126 may obtain the historical information by executing a learning procedure and/or by employing procedures such as, for example, an artificial intelligence procedure.

At block 415, the processor 126 may obtain information from the weight sensor 175 about a first laden weight of the vehicle 105.

At block 420, a determination is made whether an object has been brought into the vehicle 105. In an example scenario, the determination may be made by the processor 126 based on evaluating images provided by one or more cameras. The object can be any of various objects (suitcase, briefcase, tennis racket, bicycle, passenger etc.).

If no object has been brought into the vehicle 105, the vehicle payload assistance system 125 may provide a green signal to proceed with travel (as indicated in block 485). In one case, providing the green signal may be carried out by displaying a message on the display screen of the infotainment system 140. In another case, providing the green signal may be carried out by refraining from displaying any messages or any other indication.

If an object has been brought into the vehicle 105, at block 425, a determination is made whether the object is already included in the inventory and is a part of a known laden weight of the vehicle 105. The known laden weight may be a "safe" laden weight as a result of being lower than a payload capacity of the vehicle 105. If the object is already included in the inventory, the vehicle payload assistance system 125 may provide a green signal to proceed with travel (as indicated in block 485).

However, if the object is not included in the inventory, at block 430, the processor 126 may obtain information from the weight sensor 175 about a second laden weight of the vehicle 105.

At block 435, the second laden weight is compared to the payload capacity of the vehicle 105. In some cases, the comparing procedure can take into consideration objects that are located outside the vehicle 105 and are expected to be brought into the vehicle 105 prior to the start of the journey. For example, in one scenario, the driver 150 may be standing outside the vehicle 105 when the second laden weight is calculated. In this scenario, the weight of the driver 150 (if known, for example, via the inventory) or an estimated weight (based on statistical or empirical calculations) may be used as the second laden weight for comparing against the payload capacity of the vehicle 105.

In another scenario, the driver 150 may be seated in the vehicle 105 and may be waiting for an object to be brought into the vehicle 105 (including, for example, a passenger). In this scenario, the weight of the object (if known, for example, via the inventory) or an estimated weight of the passenger (based on statistical or empirical calculations) may be used as the second laden weight for comparing against the payload capacity of the vehicle 105.

At block 440, a determination is made whether the second laden weight exceeds the payload capacity of the vehicle 105. If the payload capacity has not been exceeded, the action indicated in block 485 is carried out (i.e., the vehicle payload assistance system 125 provides a green signal to proceed with travel). Additional actions may also be taken, such as, for example, including in the inventory, information about the object that has been brought into the vehicle 105. The information can include a short description of the object ("suitcase," for example). In one implementation, the information about the object may be placed under one or more of various classifications (luggage, package, person, etc.).

However, if the payload capacity has been exceeded, at block 445, a payload margin is determined. The payload margin may be determined by identifying a weight difference between the payload capacity of the vehicle 105 and the second laden weight. In one implementation, identifying a weight difference can include the use of a margin of error. The margin of error can be, for example, +/−2 lbs.

At block 450, the driver 150 may be notified that a laden weight of the vehicle 105 exceeds the payload margin of the vehicle 105 as a result of an object (non-inventoried) being brought into the vehicle 105. The driver 150 may also be provided guidance on how to reduce the second laden weight and avoid exceeding the payload capacity of the vehicle 105 ("remove child seat from vehicle," "remove spare tire," "reduce number of passengers" etc.). In a first example scenario, the driver 150 may be seated inside the vehicle 105 and the guidance may be provided via the infotainment system 140. In a second example scenario, the driver 150 may be standing outside the vehicle 105 and the guidance provided via the mobile device 130.

At block 455, a determination may be made whether the guidance has been accepted. In one case, the determination may be made by evaluating images of the driver 150 to detect actions being taken to remove an object from the vehicle 105. In another case, the determination may be made by detecting a reduction in the laden weight of the vehicle 105 (based on information provided by the weight sensor 175).

If the guidance is not accepted, the guidance procedure is stopped (as shown in block 480). In an example scenario, a message may also be displayed on the display of the infotainment system 140 (and/or the mobile device 130) to indicate to the driver 150 that the vehicle 105 is overloaded. The message may also include information about the overloading condition (additional weight, payload capacity, etc.). In another example scenario, driving instructions may be provided that takes into consideration the payload capacity being exceeded. The driving instructions can, for example, include a recommended travel route that addresses the weight overload. The recommended travel route can include a first road section that allows the vehicle 105 to travel in a manner that reduces or minimizes vehicle bounce and/or avoids a second road section that causes excessive vehicle bounce. Vehicle bounce may be caused by various factors such as, for example, by an unpaved road surface, a gravel road, or a bumpy road surface.

If, at block 455, the guidance is accepted, at block 460, a third laden weight of the vehicle 105 is determined. It is expected that the third laden weight is lower than the second laden weight because of one or more objects having been removed from the vehicle 105 based on the guidance.

At block 465, a determination is made whether the third laden weight exceeds the payload capacity of the vehicle 105. If the payload capacity has not been exceeded, the action indicated in block 485 is carried out (i.e., the vehicle payload assistance system 125 may provide a green signal to proceed with travel).

If the payload capacity still remains exceeded, at block 470, the driver 150 may be provided additional guidance on how to reduce the third laden weight.

At block 475, a determination may be made whether the guidance has been accepted. If the guidance is not accepted, the guidance procedure is stopped (as shown in block 480 and described above).

If the guidance is accepted, the actions indicated in block 465, block 470, and block 475 are executed reiteratively until the third laden weight is lowered to a level where the payload capacity is not exceeded (block 465). A message may be displayed upon the display screen of the infotainment system 140 informing the driver 150 of the successful reduction in weight and additional information such as, for example, about an available payload margin after reduction of the third laden weight. The message and/or information may be displayed after the vehicle 105 has been set in motion.

Figure 5:
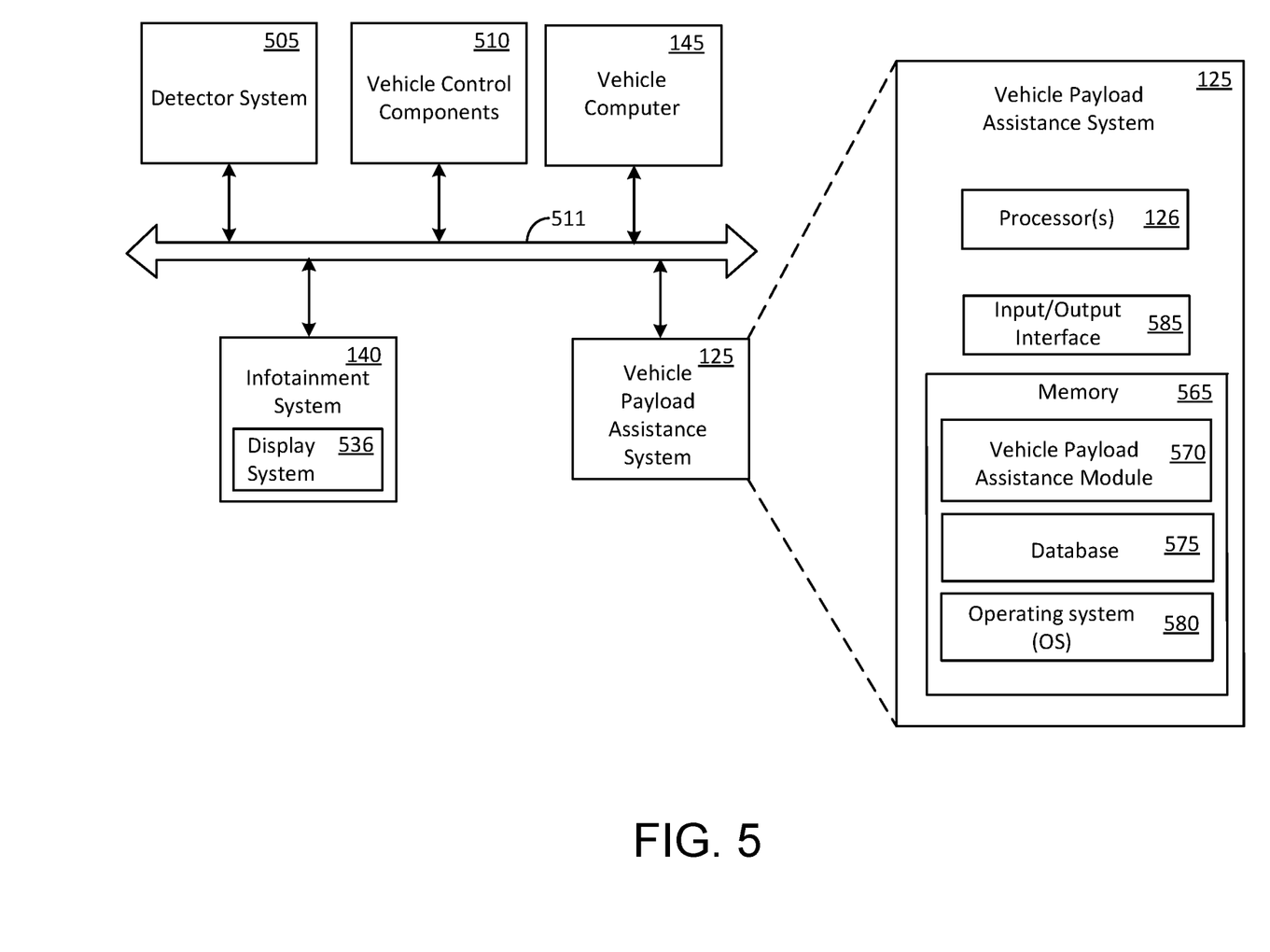
FIG. 5 shows some example components that can be included in a vehicle in accordance with an embodiment of the disclosure.

FIG. 5 shows some example components that can be included in the vehicle 105 in accordance with an embodiment of the disclosure. The example components can include a detector system 505, vehicle control components 510, the vehicle computer 145, the infotainment system 140, and the vehicle payload assistance system 125. The various components are communicatively coupled to each other via one or more buses such as an example bus 511. The bus 511 may be implemented using various wired and/or wireless technologies. For example, the bus 511 can be a vehicle bus that uses a controller area network (CAN) bus protocol, a Media Oriented Systems Transport (MOST) bus protocol, and/or a CAN flexible data (CAN-FD) bus protocol. Some or all portions of the bus 511 may also be implemented using wireless technologies such as Bluetooth®, Bluetooth®, Ultra-Wideband, Wi-Fi, Zigbee®, or near-field-communications (NFC).

The infotainment system 140 can include a display system 536 having a GUI for carrying out various operations. The GUI may be used, for example, by the driver 150 to provide information about one or more objects that are located in the vehicle 105 or may be brought into the vehicle 105. The information may be stored as a part of an inventory in a database 575 of the vehicle payload assistance system 125.

The detector system 505 can include various types of detectors such as, for example, the weight sensor 175, the camera 115, the camera 120, and the object detector 110 that are shown in FIG. 1.

The vehicle control components 510 can include various components and systems associated with driving functions of the vehicle 105 (such as, for example, the engine, brakes, accelerator, and fuel injection) and various other functions of the vehicle 105 (such as, for example, stocks and struts whose characteristics can be controlled for varying a performance of the vehicle 105). The various components may be controlled, activated, and/or operated by the vehicle computer 145 and the vehicle payload assistance system 125.

In one implementation, the vehicle payload assistance system 125 can be an independent device (enclosed in an enclosure, for example). In another implementation, some or all components of the vehicle payload assistance system 125 can be housed, merged, or can share functionality, with the vehicle computer 145. For example, an integrated unit that combines the functionality of the vehicle payload assistance system 125 with that of the vehicle computer 145 can be operated by a single processor and a single memory device. In the illustrated example configuration, the vehicle payload assistance system 125 includes the processor 126, an input/output interface 585, and a memory 565.

The input/output interface 585 is configured to provide communications between the vehicle payload assistance system 125 and other components such as the detector system 505 (for receiving images from the cameras and/or weight information from the weight sensor 175, for example).

The memory 565, which is one example of a non-transitory computer-readable medium, may be used to store an operating system (OS) 580, a database 575, and various code modules such as a vehicle payload assistance system module 570. The code modules are provided in the form of computer-executable instructions that can be executed by the processor 126 for performing various operations in accordance with the disclosure.

The vehicle payload assistance system module 570 may be executed by the processor 126 for performing various operations in accordance with the disclosure. Some example operations are described above.

The database 575 may be used to store information such as, for example, weight information related to the vehicle 105, an inventory of objects located in the vehicle 105, an inventory of objects that may be brought into the vehicle 105, historical information pertaining to objects, and information pertaining to the vehicle 105 (payload capacity, unladen weight, laden weight, etc.) that can be accessed and used by the processor 126 when executing the vehicle payload assistance system module 570. In one case, information stored in any of the database 575 pertaining to the payload capacity of the vehicle 105, may be originated by any of various sources, such as, for example, a manufacturer of the vehicle 105.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 565, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   determining, by a processor, starting of an engine of a vehicle;
   determining, by the processor at a first time subsequent to the starting of the engine, information about a first laden weight of a vehicle;
   determining, by the processor at the first time, presence of a first object outside the vehicle, wherein the first laden weight does not include a first weight of the first object;
   determining, by the processor and using at least one image sensor coupled to the vehicle, that the first object will be located inside the vehicle at or after a second time after the first time;
   determining, by the processor at the second time, a second laden weight of the vehicle, the second laden weight including the first weight of the first object;
   determining, by the processor, that the second laden weight exceeds the payload capacity of the vehicle;
   determining, by the processor, a weight difference between the second laden weight and the payload capacity; and
   providing, by the processor based on the weight difference, information about one or more objects to be removed from the vehicle.

2. The method of claim 1, wherein the processor is located in the vehicle, wherein the information about the first laden weight is obtained from a weight sensor.

3. The method of claim 2, wherein providing the information comprises displaying upon a display screen of one of an infotainment system in the vehicle or a mobile device, the weight difference.

4. The method of claim 1, further comprising determining the first weight of the first object, wherein determining the first weight of the first object comprises identifying the first object and obtaining from an inventory, weight information of the first object based on its identity.

5. The method of claim 1, wherein determining the first laden weight further comprising:
   determining, by the processor at the first time, a plurality of objects present inside the vehicle;
   determining, by the processor, an identity of each object in the plurality of objects based on evaluating an image associated with the object, wherein the image is captured using a second sensor associated with the vehicle; and
   determining, by the processor based on the identity, the weight of each object in the plurality of objects.

6. The method of claim 1, wherein determining the second laden weight occurs prior to the first item being located inside the vehicle.

7. The method of claim 1, further comprising:
   determining, at the first time, presence of a plurality of items in the vehicle;
   determining a weight of each of the plurality of objects; and
   including the weight of each of the plurality of objects in the first laden weight.

8. A method comprising:
   determining, by the processor, at a first time, a plurality of items located inside the vehicle; obtaining, by a processor, information about a first laden weight of a vehicle, the first laden weight including a weight of each of the plurality of items;
   detecting, by the processor, presence of a first item outside the vehicle, the first item being different from the plurality of items;
   determining, by the processor, a first weight of the first item;
   determining, by the processor and using at least one image sensor coupled to the vehicle, that the first item will be located inside the vehicle at or after a second time after the first time;
   determining, by the processor at the second time, using a weight sensor, a second laden weight of the vehicle, the second laden weight including the first weight of the first item wherein the second laden weight is determined prior to the first item being inside the vehicle;
   determining, by the processor, that the second laden weight exceeds a payload capacity of the vehicle; and
   issuing, by the processor, an advisory to reduce the second laden weight.

9. The method of claim 8, further comprising:
   determining, by the processor, a weight difference between the second laden weight and the payload capacity of the vehicle;
   determining, by the processor, based on the weight difference, a payload margin available for loading the vehicle; and
   executing, by the processor, a vehicle payload assistance operation to reduce the second laden weight based on the payload margin.

10. The method of claim 9, wherein executing the vehicle payload assistance operation comprises displaying upon a display screen of one of an infotainment system in the vehicle or a mobile device, the payload margin available for loading the vehicle.

11. The method of claim 8, further comprising:
    identifying, by the processor, a second weight of a second item in the vehicle; and
    recommending, by the processor, removal of the second item from the vehicle.

12. The method of claim 11, wherein the second item is a fixture of the vehicle and wherein recommending the removal of the second item from the vehicle comprises removal of the fixture from the vehicle.

13. The method of claim 8, further comprising, prior to determining the first laden weight, detecting, by a processor of a vehicle, starting of an engine of the vehicle.

14. The method of claim 8, further comprising:
    determining, by the processor at the first time, an identity of each of the items of the plurality of items; and
    determining, based on the identity, the weight associated with each of the items of the plurality of items.

15. A vehicle comprising:
    a weight sensor;
    an image sensor coupled to the vehicle; and
    a computer, comprising:
    a memory that stores computer-executable instructions; and
    a processor configured to access the memory and execute the computer-executable instructions to perform operations comprising:
    determining, at a first time, starting of an engine of the vehicle;

determining, based on the image sensor, a plurality of items in the vehicle;

determining a weight of each item of the plurality of items;

obtaining, from the weight sensor, information about a first laden weight of the vehicle, the first laden weight including the weight of each item of the plurality of items;

detecting, using the image sensor, presence of a first item outside the vehicle, the first item being different from the plurality of items;

determining, based on an identity of the first item, that the first item will be located inside the vehicle at or after a second time;

determining, at the second time, using the weight sensor, a second laden weight of the vehicle, the second laden weight including a first weight of the first item;

determining that the second laden weight exceeds a payload capacity of the vehicle; and issuing an advisory to reduce the second laden weight.

16. The vehicle of claim 15, wherein the processor is further configured to access the memory and execute the computer-executable instructions to perform additional operations comprising:

determining a weight difference between the second laden weight and the payload capacity of the vehicle;

determining, based on the weight difference, a payload margin available for loading the vehicle; and executing a vehicle payload assistance operation to reduce the second laden weight based on the payload margin.

17. The vehicle of claim 15, wherein the processor is further configured to access the memory and execute the computer-executable instructions to perform additional operations comprising:

identifying a weight of a second item in the vehicle, the second item being part of the plurality of items; and recommending removal of the second item from the vehicle.

18. The vehicle of claim 17, wherein the second item is a fixture of the vehicle and wherein recommending the removal of the second item from the vehicle comprises removal of the fixture from the vehicle.

19. The vehicle of claim 15, wherein determining the second laden weight occurs prior to the first item being located in the vehicle.

20. The vehicle of claim 15, wherein issuing the advisory comprises providing information about a second item to be removed from the vehicle and wherein the processor is further configured to access the memory and execute the computer-executable instructions to perform additional operations comprising:

detecting, using the image sensor, an action being performed in response to the advisory; and determining that the action includes removal of the second item from the vehicle.

* * * * *